W. W. HUBBELL.
Breech-Loading Fire-Arm.
No. 193. Reissued Mar. 11, 1851.
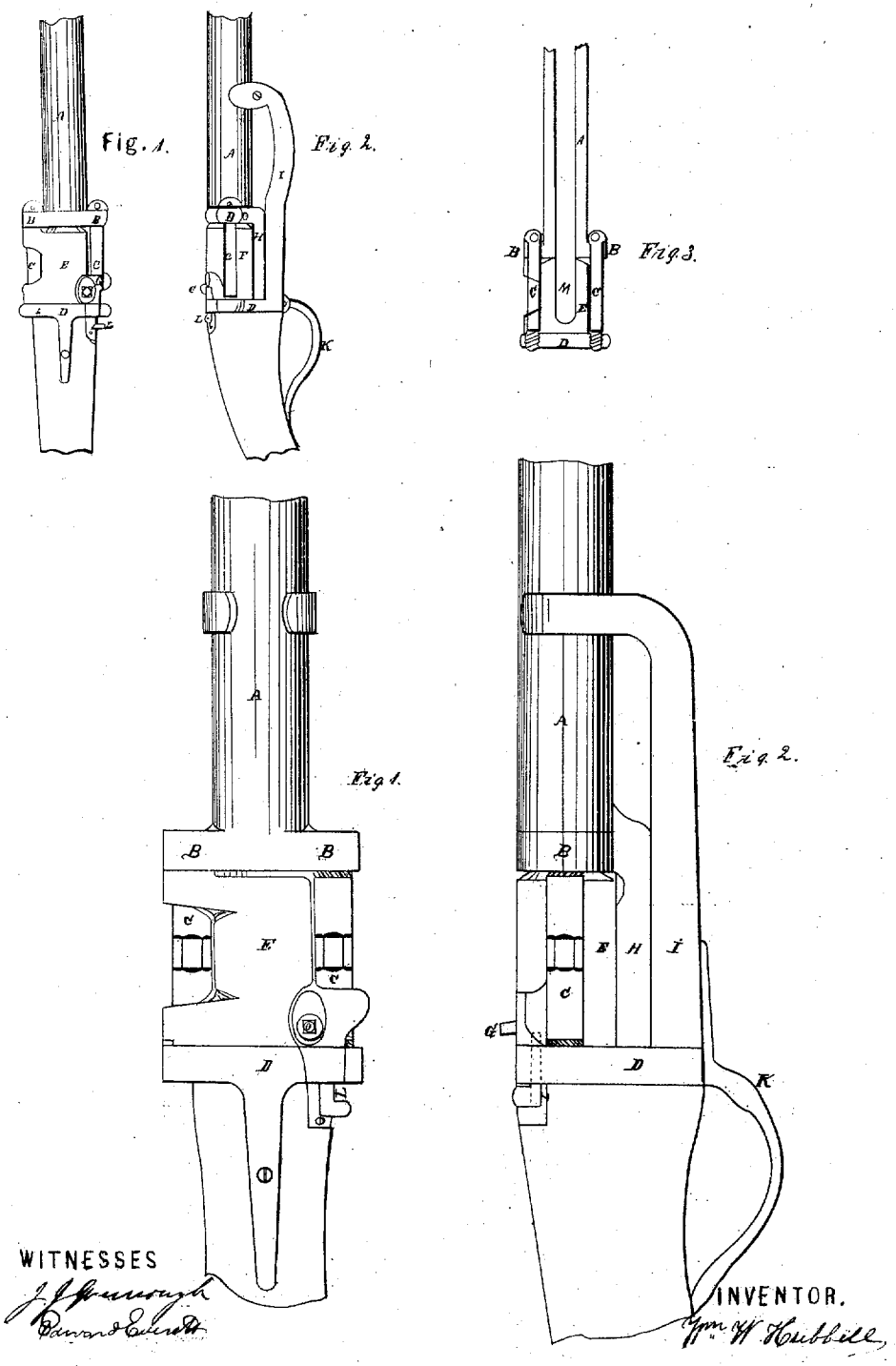
N. PETERS, PHOTO-LITHOGRAPHER, WASHINGTON, D. C.

UNITED STATES PATENT OFFICE.

WM. W. HUBBELL, OF PHILADELPHIA, PENNSYLVANIA.

IMPROVEMENT IN FIRE-ARMS.

Specification forming part of Letters Patent No. 3,649, dated July 1, 1844; Reissue No. 193, dated March 11, 1851.

*To all whom it may concern:*

Be it known that I, WILLIAM W. HUBBELL, of the city of Philadelphia, and State of Pennsylvania, have invented new and useful Improvements in Fire-Arms; and I do hereby declare that the following is a full and exact description thereof, reference being had to the accompanying drawings, which make up this specification, and of which figures the first and second of largest size are copies of the drawings annexed to the original patent, and the first and second of the smallest size are drawings of the original model gun deposited in the Patent Office, and the third is a semi-sectional view of the breech-chamber and the independent adjustable braces thereof.

In the drawings like letters refer to like parts thereof.

Figures 1 and 1 are each a perspective view of the upper part of the breech. To the sides of the back part of the main barrel A, I have two ears, B B, through which two rods, C C, pass, and are each separately screwed into a breech-plate, D, which receives the recoil end of the breech E, which contains the load, and which opens on the left-hand rod as its center, the right-hand rod acting as its correspondent, and each being movable and adjustable to regulate and determine the joint between the barrel and breech independent of the other, and both serving the purpose of bracing the main barrel to the breech-plate, and having the breech or firing-charge between them. Thus they form double independently-adjustable braces having the firing-charge between the braces, and they secure the barrel and breech in their proper relative position with a more uniform bearing and better facility to regulate and determine the joint between the barrel and breech, as occasion may require, than has heretofore existed in any breech-loading arms, and which feature is very important, so as to be able at any moment to accurately regulate the joint between the breech and barrel to suit either any irregular or uniform expansion of the breech or barrel from heat, or contraction from cold, or clogging of the joint from the refuse of the burned powder or wear from use. By screwing upon the rod or brace C or C, Fig. 3, on either side of the chamber M, and allowing its correspondent brace to remain untouched, the side of the joint nearest the altered brace is tightened; while the other side of the joint remains secured by the other brace, and by unscrewing the brace on either side of the chamber a little, and allowing its correspondent brace to remain untouched, the side of the joint nearest the altered brace is eased, while the other side of the joint remains secured by the other brace; and by uniformly screwing up both of the braces they uniformly tighten the whole joint, and by uniformly unscrewing both of the braces they uniformly ease the entire joint between the breech and the barrel. These rods or braces C C may be secured to the ears B B of the barrel by heads on the rods, as shown in the small Figs. 1, 2, and 3, or the rods or braces may screw into the ears also, as well as the breech-plate by right and left screws on each rod, as shown on the rod displayed in large Fig. 2. This independently-adjustable bracing on each side of the firing-charge, to regulate and determine the joint on either or both sides of the firing-charge between the breech and the barrel, as occasion may require, is an important improvement in the efficiency of breech-loading guns or fire-arms, which have heretofore either had no adjustable bracing, or else the adjustable bracing has been all on one side of the firing charge or joint, or where the bracing may have been double they have not been independent of each other in adjustability to alter and determine the joint. There is a percussion-tube, G, Fig. 1, on the back end of the breech to fire the charge from.

Figs. 2 and 2 are each a perspective side view, similar letters referring to the same parts as in Fig. 1. To regulate the caliber of the breech E in its descent to its place properly with that of the main barrel A, I have screwed or secured to the lower part of the barrel a tongue, H, on which the breech rests, and which tongue enters a square groove or mortise in the breech-plate D, and it will now be observed that the lower part, I, of the breech-plate extends under the whole breech, and receives the barrel in a prong, to which prong the barrel is secured by a small tongue on the barrel, having a hole through it slotted longitudinally, fitting into a groove in the base of the prong, through which prong and slotted hole a small screw is passed. These two tongues on the barrel therefore have a longitudinal play in their respective grooves, to permit the adjustable braces to act and regulate the joint between the breech and barrel. The guard K screws to the lower part of the breech-plate. The stock and breech end are secured together by the usual breech-tongue and the guard. The back-action lock I deem best to use.

A flint and steel may be used to fire the charge, the pan being where the percussion-tube is.

The breech E may have one or two chambers, a corresponding number always being in the main barrel, and when there are two a corresponding tube and lock must be on the opposite side. The breech E may open either on the right or left hand rod; but I have deemed the left hand preferable. A pin, L, secures it down.

Operation: The breech E is opened on its center, charged, closed, primed, and fired, and so on successively.

What I claim as my invention is—

1. The combination of the two independently-adjustable braces extending one on each side of the breech-chamber containing the charge that is being fired, to regulate and accurately determine the joint between the breech and barrel, substantially as described.

2. The breech opening and closing on an axis, which is parallel to the main barrel, and secured and regulated by the parts, substantially as described.

WM. W. HUBBELL.

Witnesses:
J. J. GREENOUGH,
JOEL COOK,
EDWARD EVERETT,
P. D. REMLEY.